United States Patent [19]

Anderson et al.

[11] 4,006,651

[45] Feb. 8, 1977

[54] WORK TABLE INDEX MECHANISM

[75] Inventors: Frank R. Anderson; James W. Nadon, both of Biggleswade, England

[73] Assignee: Cincinnati Milacron-Heald Corporation, Worcester, Mass.

[22] Filed: June 13, 1975

[21] Appl. No.: 586,739

[52] U.S. Cl. ............................. 74/826; 29/563; 74/813 R

[51] Int. Cl.² ...................... B23B 29/32

[58] Field of Search ............... 29/35.5, 48.5, 563; 74/813 R, 813 C, 824, 826; 269/57, 63; 51/53, 134

[56] References Cited

UNITED STATES PATENTS

| | | | |
|---|---|---|---|
| 2,975,657 | 3/1961 | Samuez | 74/826 X |
| 3,141,356 | 7/1964 | Herbkersman | 74/813 X |
| 3,241,231 | 3/1966 | Andersen | 29/563 |
| 3,355,968 | 12/1967 | Sharples | 74/826 |
| 3,718,055 | 2/1973 | Maier | 74/826 |

FOREIGN PATENTS OR APPLICATIONS 1,030,262  5/1966  United Kingdom ............ 74/813 R

*Primary Examiner*—Leonidas Vlachos
*Assistant Examiner*—W. R. Briggs
*Attorney, Agent, or Firm*—Norman S. Blodgett; Gerry A. Blodgett

[57] ABSTRACT

A machine tool having relatively rotatable elements joined by a toothed coupling.

14 Claims, 3 Drawing Figures

WORK TABLE INDEX MECHANISM

BACKGROUND OF THE INVENTION

In the design manufacture and operation of machine tools, there are many situations that arise which make it desirable to provide for an angular rotary adjustment between machine parts. The most common instance of this need has to do with the situation where the machine tool is provided with a rotary table which is capable of being accurately rotated on occasion to present another portion of a workpiece to the tool or to bring another workpiece into operative relationship to the tool. In order to perform accurate machining, the workpiece must be located accurately in the conventional six modes of motion and, while some such rotary tables produce accuracy adequately in one or two modes, it is difficult economically to design one that is accurate in all six modes.

It has been suggested in the past that the elements of a table can be accurately located relative to one another by use of a toothed coupling known as the "curvic" coupling. Entering engagement of the mating teeth of the curvic coupling is such that location of the elements relative to one another can be produced in the six modes very accurately. However, the toothed coupling of this type suffers from the disability that the accuracy of location depends upon the mating of accurately-formed surfaces having a limited area of contact. This means that the coupling is unable to resist large forces in certain modes of motion. For instance, in the case of a worktable which may carry a heavy weight of workpieces, the large axial forces between the two parts of the coupling would lead to inaccuracy and extreme wear of the locating surfaces. These and other difficulties experienced with the prior art devices have been obviated in a novel manner by the present invention.

It is, therefore, an outstanding object of the invention to provide a machine tool having angularly adjustable elements which are capable of considerable accuracy, while at the same time being able to absorb large forces.

Another object of this invention is the provision of a machine tool having a heavy duty rotary table in which the table angular position can be determined very accurately.

A further object of the present invention is the provision of a machine tool having angular location means which is purely mechanical, but which, nevertheless, is capable of great accuracy.

It is another object of the instant invention to provide a machine tool having an angularly-adjustable worktable which is simple in construction and which is capable of a long life of useful service with a minimum of maintenance.

A still further object of the invention is the provision of a machine tool having a worktable which can be rotated to a new angular position, which new position is first inaccurately determined by a powerful means and finally accurately determined by a less powerful means.

With these and other objects in view, as will be apparent to those skilled in the art, the invention resides in the combination of parts set forth in the specification and covered by the claims appended hereto.

SUMMARY OF THE INVENTION

In general, the invention consists of a machine tool having a first member on which a first curvic coupling element is mounted and a second member on which a second curvic coupling is mounted on a main axis in concentric relationship with the first curvic coupling element. Apparatus is provided for mounting the first curvic coupling element on the first member, while allowing relative movement under force in at least one mode, but not allowing such movement in the other modes.

More specifically, the relative movement takes place along the main axis between the first and second members to separate completely the teeth of the first and second curvic coupling elements, wherein the said apparatus allows the said relative movement under force when the teeth engage. The said apparatus consists of a diaphragm whose center portion is fixed to the first member and whose periphery is fixed to the first curvic coupling element.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
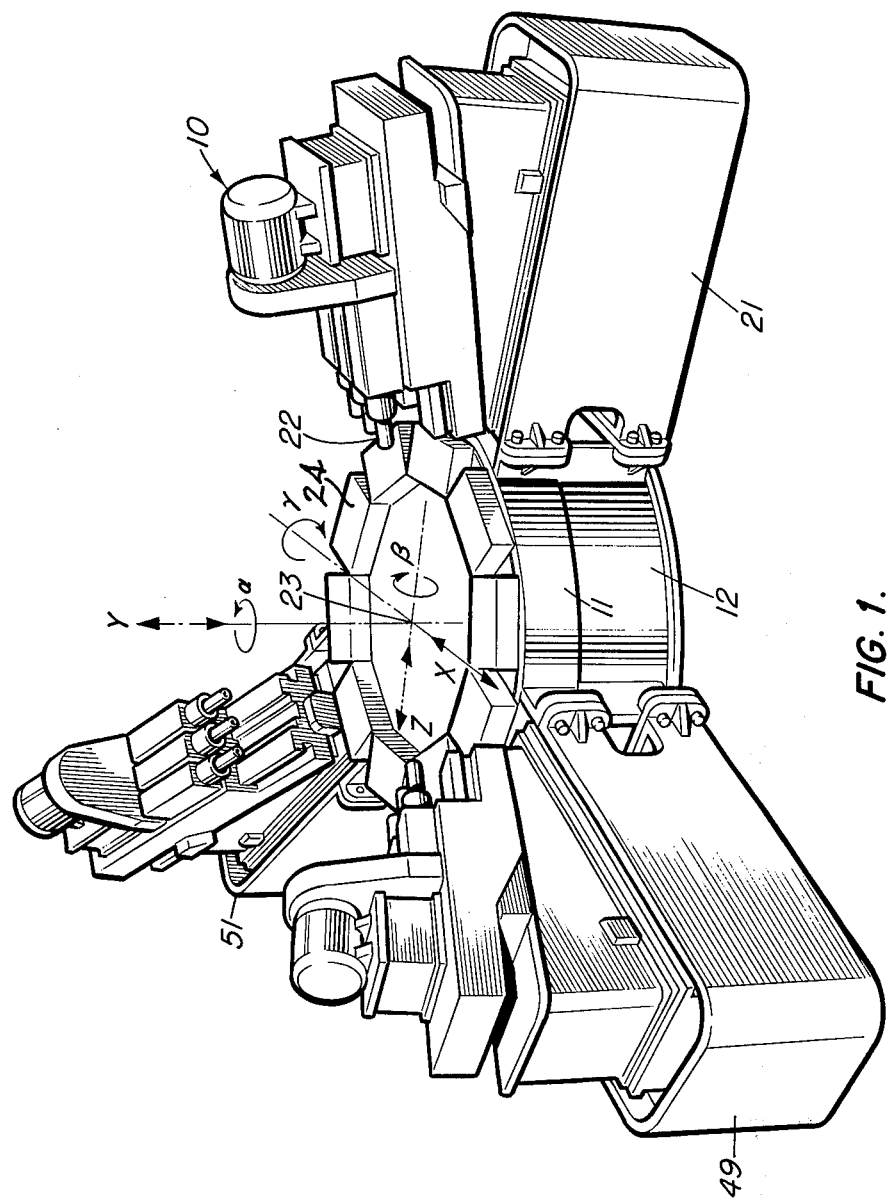
FIG. 1 is a perspective view of the machine tool embodying the principles of the present invention.

Referring first to FIG. 1, wherein are best shown the general features of the invention, the machine tool, indicated generally by the reference numeral 10, is provided with a central worktable having a first upper member 11 and a second lower member 12. The second member acts as a fixed base on which the first member is relatively movable. The first member has an upper horizontal surface 23 on which are mounted workpieces 24. Extending radially away from the members 11 and 12 is a machine element 21 having a tool 22. Similar machine elements 49 and 51 are also located around the worktable.

Figure 2:
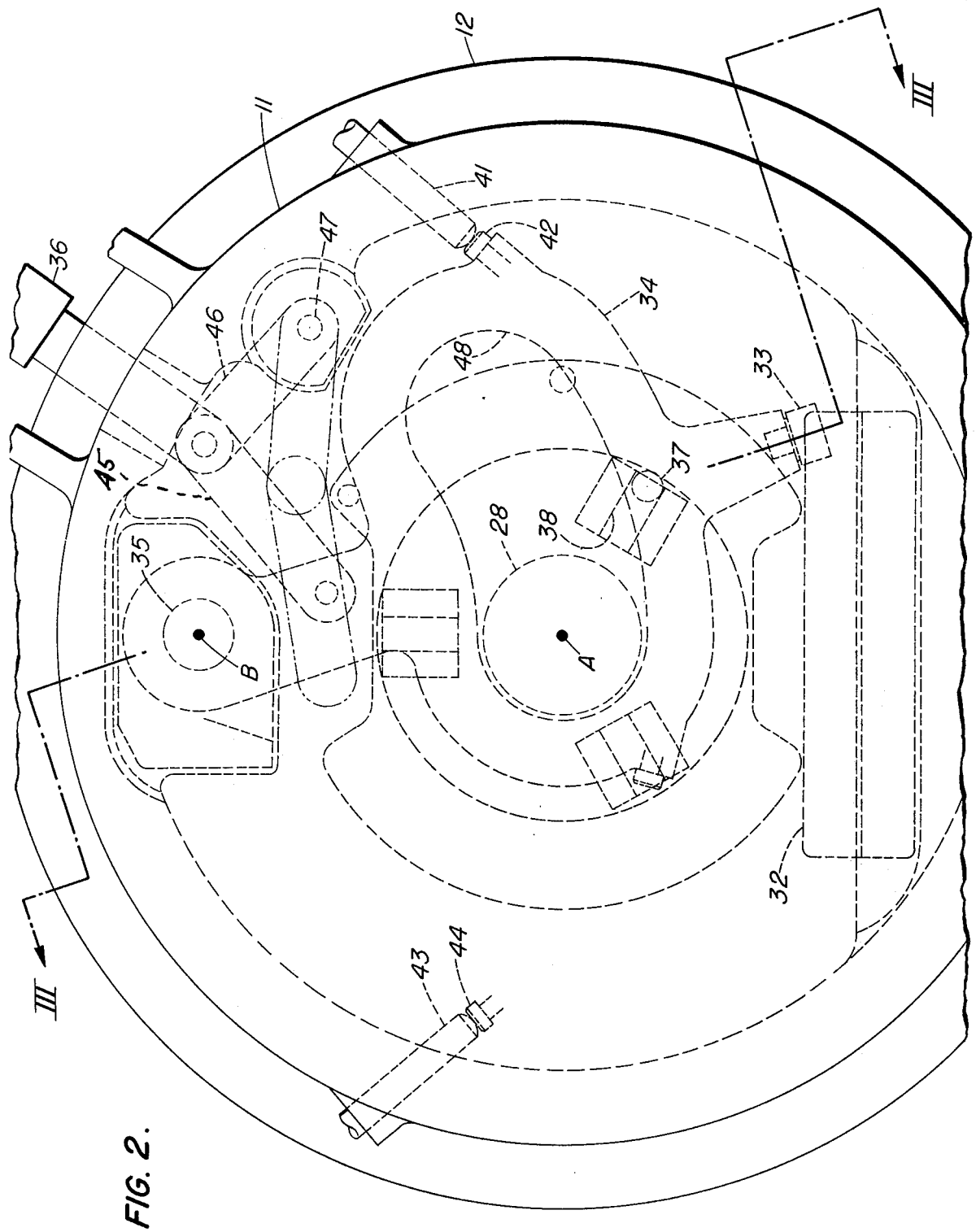
FIG. 2 is a plan view of a table forming part of the machine tool.
Figure 3:
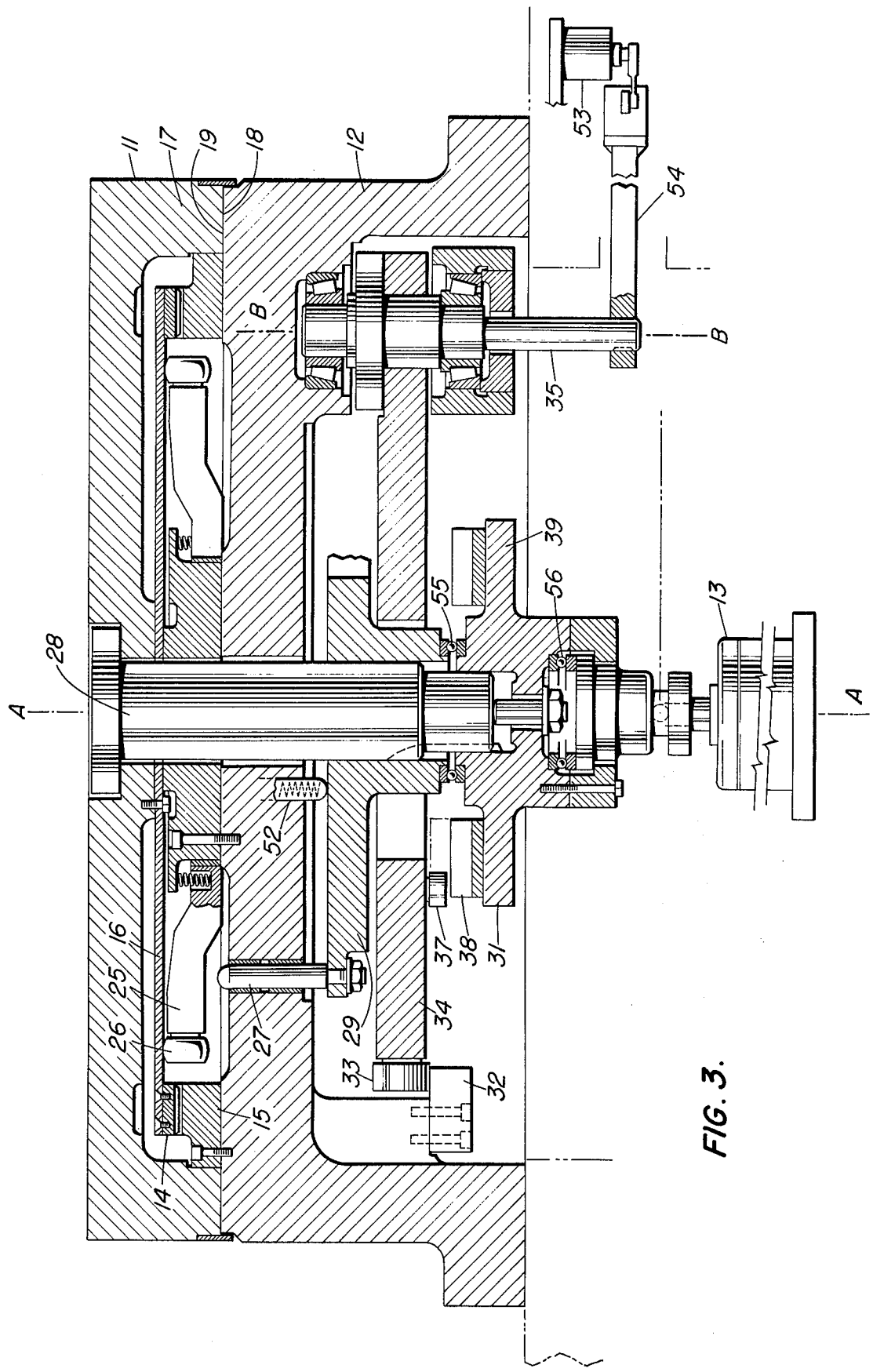
FIG. 3 is a vertical sectional view of the table taken on the line III—III of FIG. 2.

FIGS. 2 and 3 show the details of the worktable including the first member 11 and the second member 12, as well as means for moving them relative to one another. A first curvic coupling element 14 is mounted on the underside of the first member 11, while a second curvic coupling element 15 is mounted on the upper side of the member 12 in concentric facing relationship to the first coupling element, the two elements being mutually concentric to a main vertical axis A—A.

As is best evident in FIG. 3, an apparatus such as a circular diaphragm 16 is fastened in its central portion to the first member 11 and on its periphery to the first curvic coupling element 14. An hydraulic cylinder 13 is located below the member 12 and operates on a shaft 28 to produce relative movement along the axis A—A between the first and second members to separate completely the teeth of the first and second curvic coupling elements 14 and 15. The diaphragm 16, however, allows the said relative movement under force when the teeth engage. When the diaphragm 16 allows the first curvic coupling 14 to move relative to the first member 11 (during engagement of its teeth with the teeth of the second curvic coupling 15) in a translational mode along the said main axis A—A. A rotational mode takes place about an axis perpendicular to the said main axis and a rotational mode takes place about an axis perpendicular to both of the aforementioned axes. In other words, the first curvic coupling 14 is allowed to move in one translational mode and two rotational modes relative to the first member 11. The apparatus, however, does not allow the first curvic coupling 14 to move relative to the first member 11 during engagement of its teeth with the teeth of the second curvic coupling in a translation mode along a line perpendicular to the said main axis, a translation mode along a line perpendicular to both of the aforementioned line and axis, and a rotational mode about the said axis. The engagement of the teeth of the first and second coupling elements takes place when they are relatively moved along their axis A—A of concentricity. The engagement results in a movement of the first curvic coupling element and the first member 11 together in the X translational mode, the Z translational mode, and the $\beta$ rotational mode. The engagement results in relative lost motion between the first curvic coupling element 14 and the first member 11 in the Y translational mode, the $\alpha$ rotational mode, and the $\gamma$ rotational mode.

A limit to the above-mentioned lost motions and a locking engagement between the first and second members 11 and 12 is provided by an annular flange 17 extending from the first member 11. The flange has a horizontal surface 18 and the second member has a facing horizontal surface 19, both surfaces lying in planes perpendicular to the said axis A—A. The surfaces engage to prevent relative movement in the "lost motion" modes. In this connection, it should be noted that the axis of rotation of the spindle carrying the tool 22 (FIG. 1) is in the general direction of the $\gamma$ rotational mode but is at a small angle to it.

The said lost motion is due to the deflection of the diaphragm 16 and the said surfaces 18 and 19 come together before the deflection of the diaphragm exceeds a desired amount. Means, including a roller 26 and a hinged arm 25 on which the roller is mounted, is mounted on the second member 12 to deflect the diaphragm 16 to maintain the teeth out of engagement on occasion. An axially-movable peg 27 is engagable with the arm 25 to cause it to swing toward the diaphragm. The axial shaft 28 extends downwardly from the first member 11 to the second member 12 and a third member 29 is slidable along the shaft and carries the said peg 27. The hydraulic cylinder 13 is mounted under and coaxial with the shaft 28 and is movable vertically to move the said first member vertically relative to the second member. A lost motion device exists between the cylinder 13 and the first member 11, so that, as the cylinder moves upwardly, it first lifts the third member 29 to deflect the diaphragm 16. Then (after a predetermined length of travel) it lifts the first member 11 so that the surface 18 of the flange 17 moves away from the surface 19 of the second member.

As can best be seen in FIG. 2, a support mechanism extends between an arm 34 on the one hand, and the second member 12 on the other hand. The mechanism includes a shelf 32 on the second member and a cam roller 33 connected to the first member. The cam roller is carried on the end of the arm 34 which is capable of swinging motion on a shaft 35 about an axis B—B which is substantially spaced from and parallel to the said main axis A—A. An actuator, including a cylinder 36 is provided for producing the swinging motion. The arm 34 has a detent 37 which is engagable on occasion with one of a plurality of notches 38 located on a table 39, which rotates with the first member 11 and is vertically movable with the third member 29.

As in evident in FIG. 2, the arm 34 is provided with a large central aperture 48 in the form of an arcuate slot through which the shaft 28 may pass. The rotation of the arm 34 about the shaft 35 is limited at one end by a pad 42 engaging a stop 43. The cylinder 36 operates on a toggle which consists of a lever 45 and a lever 46. One end of the lever 45 is pivotally connected to the arm 34 some distance away from the axis B—B of the shaft 35, while its other end is pivotally connected to the piston rod of the cylinder 36 and to one end of the link 46. The other end of the link 46 is pivotally connected to a shaft 47 mounted in the second member 12.

In FIG. 3 it can be seen that a thrust bearing 56 exists between the piston rod of the cylinder 13 and the table 39, while a similar thrust bearing exists between the table 39 and the third member 29. The lower end of the shaft 35 is provided with an arm 54 which engages a switch 53 and, since the shaft 35 is keyed to the arm 34, this means is used to relay the arrival at the extreme position of the arm to the machine tool controls.

The operation of the machine tool 10 will now be readily understood in view of the above description. In general, the first member 11 is rotated from one angular position to another in order to present the workpieces 24 one at a time to the various machine units 21, 49 and 51. It is necessary that, when this angular change takes place, the workpiece be re-located accurately in all modes of motion. The modes of motion described in connection with this application are those recognized in the industry for machining centers. The three modes of translation motion are: Y represents motion in the vertical direction of the axis A—A, X represents motion in a horizontal direction transversely of the tool axis, and Z represents motion in a horizontal direction in the direction of the tool axis. The modes of rotational motion are: the $\alpha$ rotation about the vertical axis A—A (yaw mode), the $\beta$ mode which is rotation about a horizontal axis perpendicular to the tool axis (pitch mode) and the $\gamma$ mode (roll mode) which is rotational motion about an axis in the direction of the tool axis. The curvic coupling incorporated in the apparatus is described in detail in the Wildhaber patent, U.S. Pat. No. 2,384,582 and its use is also described in the patent of Perry et al, U.S. Pat. No. 3,540,566, as well as the patent of Perry et al, U.S. Pat. No. 3,650,018.

Let us assume that the tool 22 has just finished an operation on a workpiece 24 which is aligned in front of it. It is, therefore, necessary now to lift the first member 11, so that the teeth of the coupling element 14 disengage from the teeth of the coupling element 15 fastened to the second member 12. Once the member 11 has been lifted free, it can be rotated. For this purpose, the arm 34 swings back and forth from contact of the pad 42 with the stop 41 to contact of the pad 44 with the stop 43. In the process of swinging in this manner, it acts as a ratchet, due to engagement of the detent 37 with the notches 38 on the table 39. As is evident in FIG. 2 the arm 34 must be supported on its outboard end and this is accomplished by the engagement of the roller 33 with the shelf 32. The thrust of the cylinder 36 on the toggle made up of the links 45 and 46 causes the arm to move. Before that has happened, of course, the cylinder 13 has pushed the table 34 upwardly, so that the detent 37 engages a groove 38 in the table 39. The extent of the rotation is determined by the engagement of the arm 54 with the switch 53 which operates through the controls so cause the cylinder 36 to be de-energized when the arm has swung far enough for the pad 44 to engage the stop 43. The upward movement of the cylinder 13, operating through the table 39 and the third member 29, causes the peg 27 to engage the arm 25 and push upwardly on the roller 26, thus causing the diaphragm 16 to be bent upwardly and to move the teeth of the coupling element 14 away from the teeth of the coupling 15. Once the rotation has been completed, the cylinder 13 is lowered to lower the first member 11 down into engagement again with the element member 12. As the upper member 11 is lowered, the first thing that occurs is the engagement of the surfaces 18 and 19. At that time, the diaphragm 16 is still deflected upwardly, so that the teeth of the coupling element 14 do not engage the teeth of the coupling element 15. As the cylinder continues downwardly, lowering the third member 29 still further, the peg 27 moves downwardly and the arm 25 moves downwardly carrying the roller 26 with it. This allows the diaphragm 6 to deflect in the downward direction, so that the teeth of the coupling element 14 eventually engage the teeth of the coupling element 15. The engagement of the surfaces 18 and 19 have already determined the location of the workpiece along the axis A—A in the translation direction Y. It has also determined the location of the workpiece in the rotational modes of yaw and roll, that is to say, $\beta$ and $\gamma$. It does not determine, however, the location of the workpiece in the rotational $\alpha$ mode (about the axis A—A) or in the two horizontal translation modes X and Z. These last three modes are determined by the engagement of the teeth of the element 14 with the teeth of the element 15 which, because of the nature of the curvic coupling, cause a last minute shifting of the member 11 relative to the member 12. The sliding of these two members together over the broad contact surfaces 18 and 19 permit rotation about the axis A—A as well as sliding motion in the two horizontal directions. The interengagement of the teeth of the coupling cause these final adjustments to be made for very accurate location of the member 11 relative to the member 12 and, therefore, of the workpiece 24 relative to the tool 22.

The advantages of the present construction will be recognized from the above description. To begin with, one of the major forces encountered by the machine tool is the weight of the workpieces 24. The modes of motion which are restricted and determined by the teeth on the coupling elements 14 and 15 are the two horizontal translation motions and the rotary motion about the axis A—A. These three modes of motion do not represent any large forces that would tend to destroy the accuracy of the teeth in the coupling elements. Furthermore, at the time when the coupling elements are locating the element 11 accurately, there are no great forces operating on the teeth. The only large force available at that time is the weight of the workpieces and this is absorbed by the engagement of the surfaces 18 and 19. It can be seen, then, that the present apparatus is very simple and rugged and that it is capable of operating indefinitely with only ordinary maintenance. Naturally, the operation will be controlled in the usual way by the introduction of hydraulic fluid into the cylinders 13 and 36, the conventional control means operating in conjunction with the switch 53.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Machine tool, comprising
   a. a first member including a workpiece table,
   b. a second member including a base with a tool spindle, the spindle rotating about an axis in a plane passing through the axis of $\gamma$ rotational mode,
   c. means moving the members relative to one another,
   d. a first curvic coupling element mounted on the first member,
   e. a second curvic coupling element mounted on the second member in concentric relationship on a main axis with the first curvic coupling element,
   f. apparatus mounting the first curvic coupling element on the first member allowing relative movement under force in at least one mode, but not allowing such movement in the other modes, the apparatus consisting of a circular diaphragm whose center portion is fixed to the first member and whose periphery is fixed to the first curvic coupling element, engagement of the teeth of the first and second coupling elements taking place when they are relatively moved along their axis of concentricity, the engagement resulting in movement of the first curvic coupling element and the first member together in the X translation mode, the Z translation mode, and the $\beta$ rotational mode and the engagment resulting in relative lost motion between the first curvic coupling element and the first member in the Y translation mode, the $\alpha$ rotational mode, and the $\gamma$ rotational mode,
   g. an annular flange extending from one of the members providing a limit to the said lost motions and a locking engagement between the first and second members, the flange and the other member having facing surfaces lying in planes perpendicular to the said axis, the surfaces engaging to prevent relative movement in the lost motion modes, the said lost motion being due to deflection of the diaphragm, and the said surfaces coming together before the deflection of the diaphragm exceeds a permissible amount, and
   h. means provided to deflect the diaphragm to maintain the teeth cut of engagement on occasion, the said means consisting of a roller engaging the diaphragm, a hinged arm on which the roller is mounted on the second member, and an axially-movable peg engageable with the arm to cause it to swing toward the diaphragm.

2. Machine tool as recited in claim 1, wherein an axial shaft extends from the first member to the second member and a third member is slidable along the shaft and carries the said peg.

3. Machine tool as recited in claim 1, wherein a hydraulic cylinder is mounted under and coaxial with the axial shaft and is movable vertically to move the said first member vertically relative to the second member, and wherein a lost motion device exists between the cylinder and the first member, so that, as the cylinder moves upwardly, it first lifts the third member to deflect the diaphragm and then, after a predetermined length of travel, it lifts the first member so that the surface of the flange moves away from the surface of the second member.

4. Machine tool as recited in claim 3, wherein a coarse detent mechanism extends between the first member on the one hand and the second member on the other hand, the mechanism including a cam on the second member and a cam follower connected to the first member, the cam follower being carried on the end of an arm which is capable of swinging motion on a shaft about an axis which is spaced from and parallel to the said main axis and which has an actuator for producing the swinging motion, the arm having a detent which is engageable on occasion with one of a plurality of notches located on a table which rotates with the first member and vertically movable with the third member.

5. Machine tool, comprising
 a. a first member,
 b. a second member,
 c. means moving the members relative to one another,
 d. a first curvic coupling element mounted on the first member,
 e. a second curvic coupling element mounted on the second member in concentric relationship on a main axis with the first curvic coupling element,
 f. apparatus mounting the first curvic coupling element on the first member allowing relative movement under force in at least one mode, but not allowing such movement in the other modes, the apparatus consisting of a circular diaphragm whose center portion is fixed to the first member and whose periphery is fixed to the first curvic coupling element, relative movement along the main axis taking place between the first and second members to completely separate the teeth of the first and second curvic coupling element, the said apparatus allowing the said relative movement under force when the teeth engage, so that the said apparatus allows the first curvic coupling to move relative to the first member during engagement of its teeth with the teeth of the second curvic coupling in:
  a translation mode along the said main axis,
  a rotational mode about an axis perpendicular to said main axis, and
  a rotational mode about an axis perpendicular to both of the aforementioned axes, and so that the said apparatus does not allow the first curvic coupling to move relative to the first member during engagment of its teeth with the teeth of the second curvic coupling in:
  a translation mode along a line perpendicular to the said main axis,
  a translation mode along a line perpendicular to both of the aforementioned line and axis, and
  a rotational mode about the said axis.

6. Machine tool as recited in claim 5, wherein engagement of the teeth of the first and second coupling elements takes place when they are relatively moved along their axis of concentricity, the engagement resulting in movement of the first curvic coupling element and the first member together in the X translation mode, the Z translation mode, and the $\beta$ rotational mode, the engagement resulting in relative lost motion between the first curvic coupling element and the first member in the Y translation mode, the $\alpha$ rotational mode, and the $\gamma$ rotational mode.

7. Machine tool as recited in claim 6, wherein a limit to the said lost motions and a locking engagement between the first and second members is provided by an annular flange extending from one of the members, the flange and the other member having facing surfaces lying in planes perpendicular to the said axis, the surfaces engaging to prevent relative movement in the lost motion modes.

8. Machine tool as recited in claim 7, wherein a base having a tool spindle is connected to the second member, and a workpiece table forms a part of the first member, the spindle rotating about an axis in a plane passing through the axis of $\gamma$ rotational mode.

9. Machine tool as recited in claim 8, wherein the said lost motion is due to deflection of the diaphragm, and wherein the said surfaces come together before the deflection of the diaphragm exceeds a permissible amount.

10. Machine tool as recited in claim 9, wherein means is provided to deflect the diaphragm to maintain the teeth cut of engagement on occasion.

11. Machine tool as recited in claim 10, wherein the said means consists of a roller engaging the diaphragm, a hinged arm on which the roller is mounted on the second member, and an axially-movable peg engageable with the arm to cause it to swing toward the diaphragm.

12. Machine tool as recited in claim 11, wherein an axial shaft extends from the first member to the second member and a third member is slidable along the shaft and carries the said peg.

13. Machine tool as recited in claim 10, wherein a hydraulic cylinder is mounted under and coaxial with the axial shaft and is movable vertically to move the said first member vertically relative to the second member, and wherein a lost motion device exists between the cylinder and the first member, so that, as the cylinder moves upwardly, it first lifts the third member to deflect the diaphragm and then, after a predetermined length of travel, it lifts the first member so that the surface of the flange moves away from the surface of the second member.

14. Machine tool as recited in claim 13, wherein a coarse detent mechanism extends between the first member on the one hand and the second member on the other hand, the mechanism including a cam on the second member and a cam follower connected to the first member, the cam follower being carried on the end of an arm which is capable of swinging motion on a shaft about an axis which is spaced from and parallel to the said main axis and which has an actuator for producing the swinging motion, the arm having a detent which is engageable on occasion with one of a plurality of notches located on a table which rotates with the first member and vertically movable with the third member.

* * * * *